United States Patent
Stärk

(10) Patent No.: US 6,531,028 B2
(45) Date of Patent: Mar. 11, 2003

(54) METHOD FOR FIXING A CERAMIC COMPONENT IN A METALLIC SUPPORT

(75) Inventor: Klaus Friedrich Stärk, Untersiggenthal (CH)

(73) Assignee: Alstom (Switzerland) Ltd, Baden (CH)

(*) Notice: Subject to any disclaimer, the term of this patent is extended or adjusted under 35 U.S.C. 154(b) by 120 days.

(21) Appl. No.: 09/799,117

(22) Filed: Mar. 6, 2001

(65) Prior Publication Data

US 2001/0018791 A1 Sep. 6, 2001

(30) Foreign Application Priority Data

Mar. 6, 2000 (DE) .......................... 100 10 923

(51) Int. Cl.⁷ .............................. B32B 31/26; F16B 4/00
(52) U.S. Cl. ..................... 156/293; 156/294; 156/306.3
(58) Field of Search ........................ 156/293, 294, 156/306.3

(56) References Cited

U.S. PATENT DOCUMENTS

| 4,312,599 A | 1/1982 | Darolia |
| 4,396,445 A | * 8/1983 | Sasaki et al. |
| 4,874,674 A | 10/1989 | Oda et al. |
| 4,991,991 A | 2/1991 | Ito et al. |
| 5,174,660 A | 12/1992 | Seibig |
| 5,496,646 A | 3/1996 | Bacigalupo |

FOREIGN PATENT DOCUMENTS

| DE | 2 013 713 | 10/1971 |
| DE | 3039479 A1 | 9/1981 |
| DE | 3535511 A1 | 4/1986 |
| DE | 4032803 C2 | 4/1992 |
| DE | 4301927 A1 | 9/1993 |

* cited by examiner

*Primary Examiner*—Curtis Mayes
(74) *Attorney, Agent, or Firm*—Burns, Doane, Swecker & Mathis, L.L.P.

(57) ABSTRACT

A method for fixing of a ceramic component in a metallic support including a first method step, a bush, consisting of gray cast iron with lamellar graphite, is placed around the ceramic component, in a second method step, the ceramic component including the bush are annealed at temperatures in the range from 500 to 750° C. until the bush has an increase in volume as a result of internal oxidation that causes the ceramic component to be permanently fixed and in that finally, after cooling down, the ceramic component with the bush are introduced into the metallic support and secured in the support.

5 Claims, 3 Drawing Sheets

METHOD FOR FIXING A CERAMIC COMPONENT IN A METALLIC SUPPORT

This application claims priority under 35 U.S.C. §§ 119 and/or 365 to Appln. No. 100 10 923.3 filed in Germany on Mar. 6, 2000; the entire content of which is hereby incorporated by reference.

FIELD OF THE INVENTION

The invention relates to a method and a device for fixing a ceramic component in a metallic support. A ceramic component of this type is, for example, the ceramic insulating bush for the high-voltage ignition conductor which is arranged in the ignition torch of a gas turbine.

BACKGROUND OF THE INVENTION

It is known prior art to use ceramic adhesives to cement insulating bushes made of $Al_2O_3$ in the metallic support of the ignition torch of a gas turbine. The insulating bushes insulate the high-voltage ignition conductor from the metallic support.

To ensure a good connection between the metallic support and the insulating bushes, heat curing of the adhesive must take place.

This known type of fastening of ceramic insulating bushes in a metallic support has a series of disadvantages. On the one hand, the ceramic adhesive is very difficult to introduce into the intermediate space between the insulating bush and the metallic support. Sometimes it must be injected into the intermediate space with a syringe, which is difficult to handle. The ceramic adhesive used requires a very narrow gap. This has unfavorable effects on assembly. On the other hand, the adhesive shrinks considerably during curing (by about 20 to 30%), which leads to a reduction in the adhesive, with the result that the bush is often cemented only poorly in the metallic support and the adherence is inadequate.

SUMMARY OF THE INVENTION

The invention is based on the object of eliminating these disadvantages of the known prior art and developing a method for fixing a ceramic component in a metallic support and a device for this purpose which is easy to handle, always ensures good adherence between he ceramic component and the metallic support and is available inexpensively and everywhere.

According to the invention, this is achieved in the case of a method for the fixing of a ceramic component in a metallic support by a bush consisting of gray cast iron with lamellar graphite being placed around the ceramic component in a first method step, the ceramic component including the bush being annealed at temperatures in the range from 500 to 750° C. in a second method step, until the bush has an increase in volume as a result of internal oxidation that causes the ceramic component to be permanently fixed by shrinkage and, after cooling down, the ceramic component with the bush being introduced into the metallic support and secured in the support.

According to the invention, this is achieved in the case of a device for the fixing of a ceramic component in a metallic support by the device comprising a bush which is produced from gray cast iron with lamellar graphite and is arranged at those locations of the ceramic component at which the ceramic component is to be fixed in the metallic support, the ceramic component being fixed in the bush by shrinkage on account of internal oxidation of the gray cast iron with lamellar graphite. The ceramic component is, for example, an insulating bush for a high-voltage ignition conductor which is arranged in the ignition torch of a gas turbine.

The advantages of the invention are that a permanent connection can be produced by a simple annealing operation, without special assembly know-how being necessary. Since the increase in volume of the gray cast iron occurs only where oxygen enters during the annealing operation, uniform surface pressure occurs between the ceramic component and the bush made of gray cast iron. A self-healing effect advantageously occurs, because at temperatures above 500° C. the oxidation recommences where the connection has loosened. It stops where no more oxygen enters. In this way, very good adherence is achieved. Finally, it is also an advantage of the invention that the connection can be nondestructively released again at high temperature (about 700 to 800° C.) by pressing out.

It is expedient if the annealing of the ceramic component including the bush made of gray cast iron with lamellar graphite is carried out at a temperature of approximately 700° C. At this temperature, the internal oxidation takes place in a comparatively short time, which has favorable effects on production costs.

It is also advantageous if the bush made of gray cast iron with lamellar graphite is secured in the metallic support by center punch marks on the support. This is a simple and quick method.

It is also of advantage if GG 20–25 is used as the material for the bush, because this material is available everywhere and is comparatively inexpensive. What is more, the graphite flakes are open toward the outside, so that in this way oxygen is brought into the material, making the internal oxidation and the associated increase in volume possible in the first place.

Finally, it is expedient if glass ceramic with a similar modulus of elasticity and coefficient of thermal expansion as the bush made of gray cast iron with lamellar graphite is used as the material for the ceramic component, because in this way no additional longitudinal stresses are produced in the ceramic in the event of temperature changes.

(A) Preferred embodiment/s of the invention is/are disclosed in the following description and is illustrated in the accompanying drawings, in which.

Detailed Description of the Invention

Figure 1:
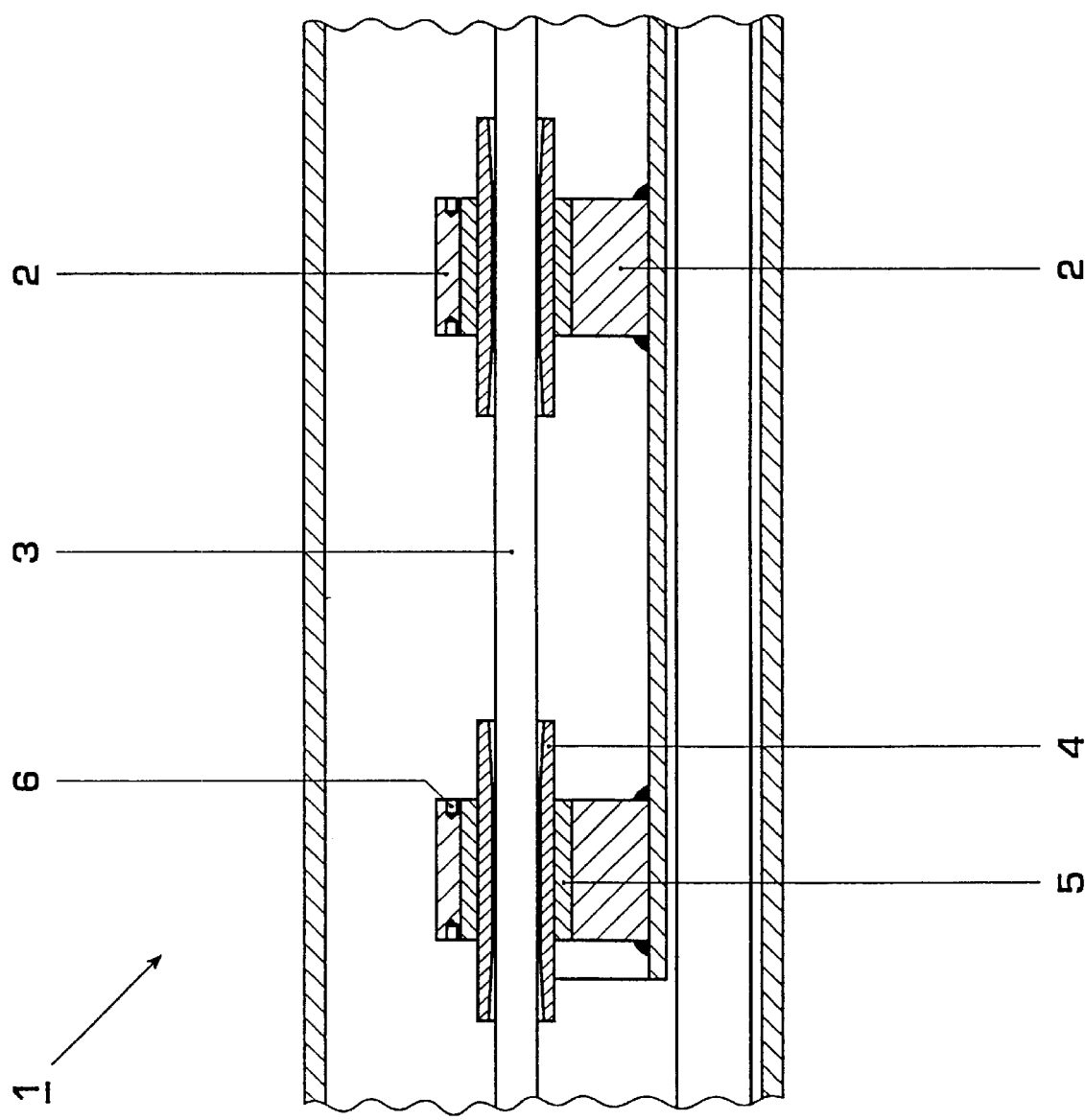
FIG. 1 is a partial sectional view of the ignition torch of a gas turbine.

In FIG. 1, a partial sectional view of the ignition torch 1 of a gas turbine is represented. A high-voltage ignition conductor 3 is arranged in a metallic support 2, for example made of St S 18/8. This high-voltage ignition conductor 3 is insulated from the metallic support 2 by means of a plurality of ceramic components 4, which are arranged around the circumference of the high-voltage ignition conductor spaced apart from one another in the axial direction of the high-voltage ignition conductor 3. In FIG. 1, two ceramic components 4 are depicted by way of example. In this exemplary embodiment, the components 4 are insulating bushes made of glass ceramic. Glass ceramic can be machined well by turning and has a similar modulus of elasticity and coefficient of thermal expansion as gray cast iron. Arranged around the components 4 at the locations at which they are to be fixed in the metallic support 2 are bushes 5 made of gray cast iron with lamellar graphite, here GG 20. The ceramic components 4 are anchored in the bushes 5 on account of internal oxidation of the gray cast iron with lamellar graphite, i.e. the ceramic is fixed in terms of pressure.

The method according to the invention is characterized in that the bush 5, consisting of gray cast iron with lamellar graphite, preferably GG 20–25 (DIN 1691), is placed around the ceramic component 4 in a first method step, the ceramic component 4 including the bush 5, i.e. as one part, are annealed at temperatures in the range from 500 to 750° C. in a second method step, until the bush 5 has an increase in volume as a result of internal oxidation that causes the ceramic component 4 to be permanently fixed, and in that finally, after cooling down, the ceramic component 4 with the bush 5 is introduced into the metallic support 2 and secured in the support 2 in the last method step. This securement preferably takes place simply by means of center punch marks on the support 2. The placement points for the securing center punches (blind holes for placing the center punch when securing against slipping out) are designated in FIG. 1 by 6.

To be specified as preferred treatment parameters for the joint annealing of the ceramic component 4 and the gray cast-iron bush 5 are approximately 700 to 750° C. and 2 days (48 hours). At these treatment temperatures, the internal oxidation takes place in a comparatively short time, which has favorable effects on production costs.

Figure 2:
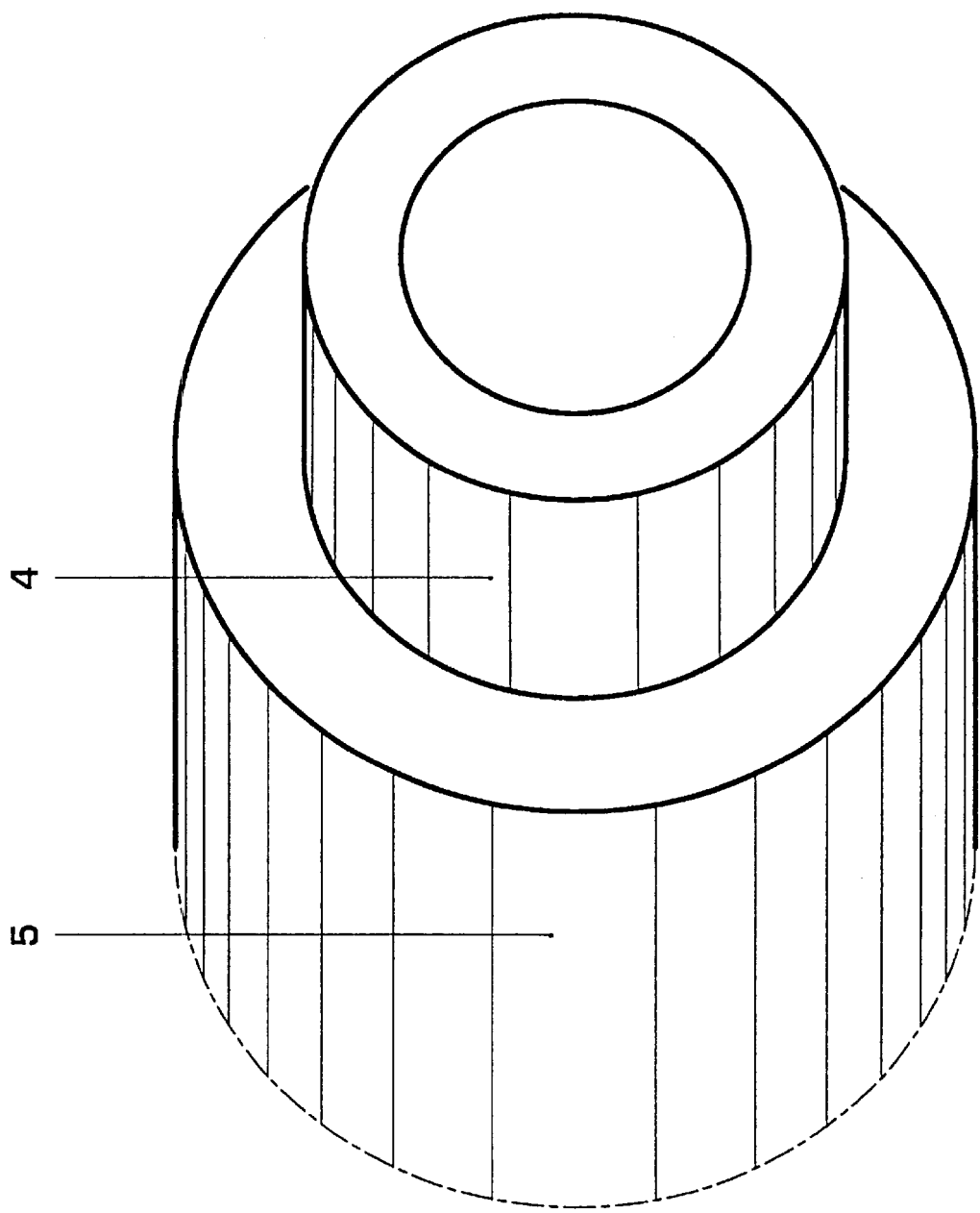
FIG. 2 is a perspective view of the glass ceramic and gray cast-iron bush after the annealing treatment.

FIG. 2 shows a sectional view of the glass-ceramic and gray cast-iron bush after the annealing treatment. The ceramic component 4 is firmly connected to the bush 5 made of GG 20 and is consequently fixed in terms of pressure by frictional forces.

The advantages of the invention are that a permanent connection of a ceramic component 4 and a bush 5 can be produced by a simple annealing operation, without special assembly know-how being necessary. Since the increase in volume of the gray cast iron with lamellar graphite occurs only where oxygen enters during the annealing operation, uniform surface pressure occurs between the ceramic component 4 and the bush 5 made of gray cast iron. A self-healing effect advantageously occurs, because at temperatures above 500° C. the oxidation recommences where the connection has loosened. It stops where no more oxygen enters. In this way, very good adherence is achieved. Finally, it is also an advantage of the invention that the connection can be nondestructively released again at high temperature by pressing out. A further advantage of the invention is that GG 20 to GG 25 can be used as the material for the bush. This material is inexpensive and easily available everywhere.

What is more, the graphite flakes are open toward the outside, so that in this way oxygen is brought into the material, making the internal oxidation and the associated increase in volume possible in the first place. If gray cast iron with nodular graphite were used instead of gray cast iron with lamellar graphite, the invention would not be effective, because no oxygen uptake over a relatively large volume can occur and consequently no internal oxidation can occur.

Figure 3:
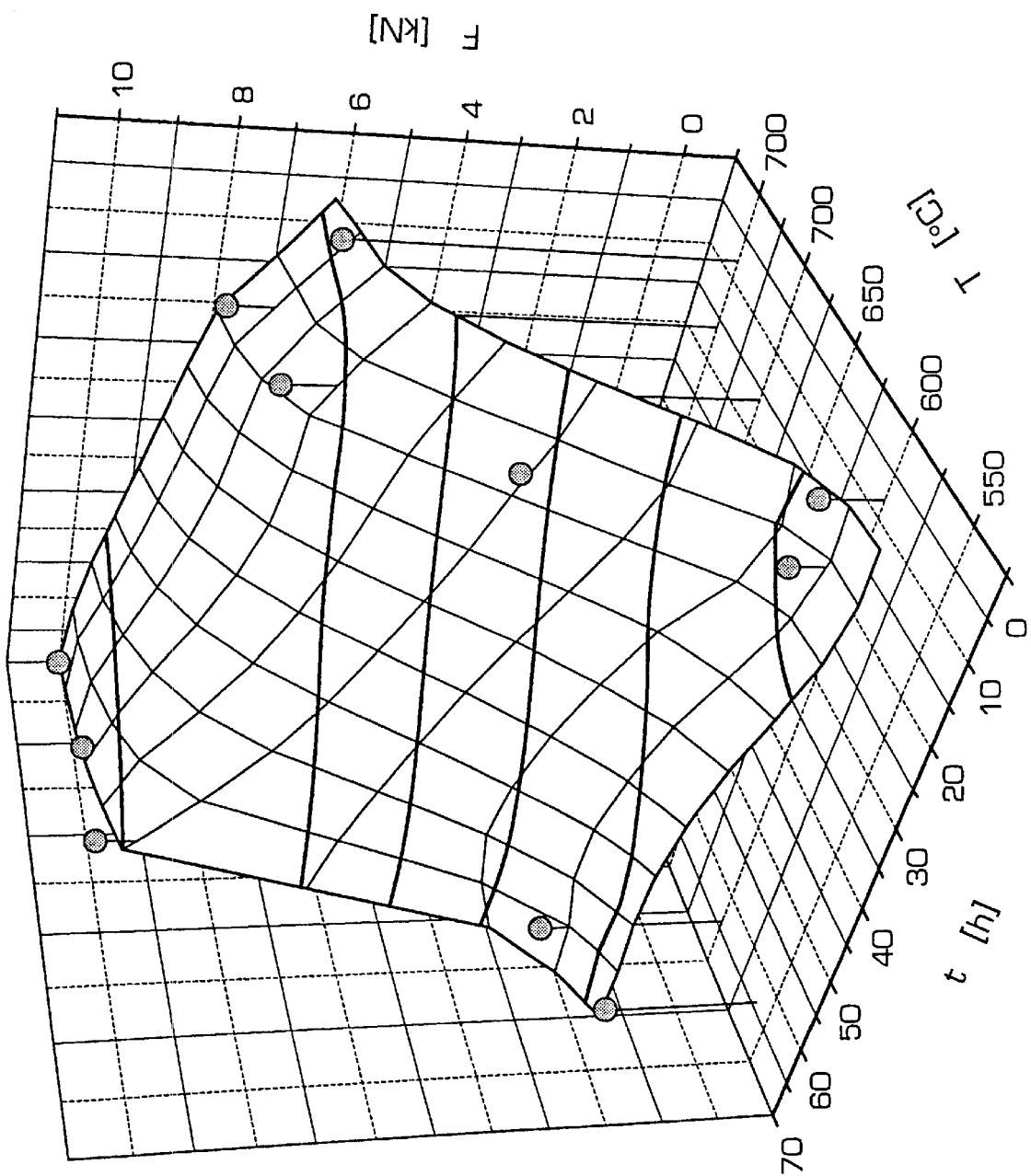
FIG. 3 is a diagram in which the dependence of the pressing force caused by internal oxidation of GG 20 on the annealing duration and annealing temperature is represented.

FIG. 3 shows in a diagram the dependence of the force which is necessary to press the ceramic component 4 out of the bush 5 made of GG 20 after oxidation in—as a function of the annealing duration and annealing temperature. The pressing force increases with increasing annealing duration (10–60 hours) and increasing annealing temperature (550–750° C.).

It goes without saying that the invention is not restricted to the exemplary embodiment described.

What is claimed is:

1. A method for the fixing of a ceramic component in a metallic support, the method comprising:

placing a bush, comprising of gray cast iron with lamellar graphite around the ceramic component;

annealing the ceramic component and the bush at temperatures in the range from 500 to 750° C. until the bush has an increase in volume as a result of internal oxidation causing the ceramic component to be permanently fixed; and cooling down the ceramic component and the bush, and then introducing the ceramic component and the bush into the metallic support and securing to the metallic support.

2. The method as claimed in claim 1, wherein the annealing of the ceramic component including the bush made of gray cast iron with lamellar graphite is carried out at a temperature of approximately 700 to 750° C.

3. The method as claimed in claim 1, wherein the bush made of gray cast iron with lamellar graphite is secured in the metallic support by center punch marks on the support.

4. The method as claimed in claim 1, wherein GG 20–25 is used as the material for the bush.

5. The method as claimed in claim 1, wherein glass ceramic with a similar modulus of elasticity and coefficient of thermal expansion as the bush made of gray cast iron with lamellar graphite is used as the material for the ceramic component.

* * * * *